Figure 1:
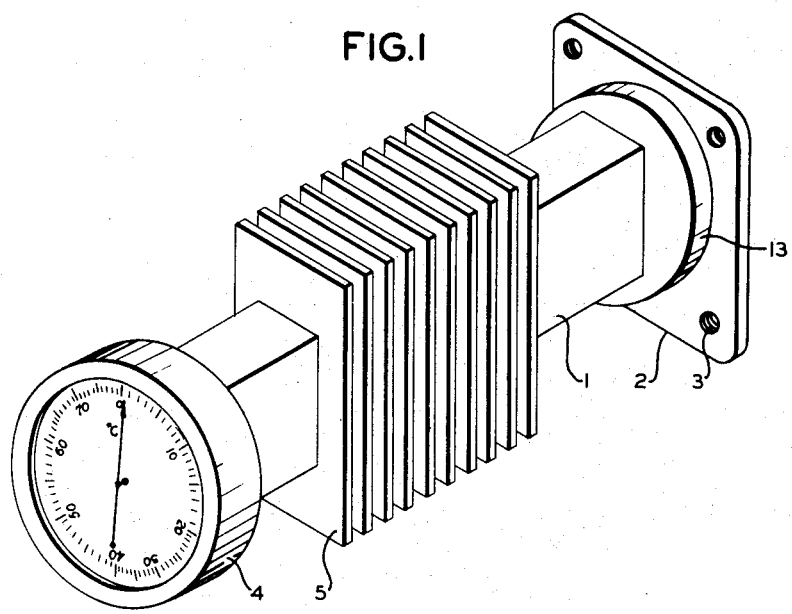

Aug. 4, 1953

L. M. HOLLINGSWORTH 2,648,047

WAVE GUIDE CALORIMETER WATTMETER

Filed Aug. 4, 1945

INVENTOR
LOWELL M. HOLLINGSWORTH

BY

ATTORNEY

Patented Aug. 4, 1953

2,648,047

UNITED STATES PATENT OFFICE 2,648,047

WAVE GUIDE CALORIMETER WATTMETER

Lowell M. Hollingsworth, Cambridge, Mass., assignor, by mesne assignments, to the United States of America as represented by the Secretary of the Navy Application August 4, 1945, Serial No. 608,959

2 Claims. (Cl. 324—95)

This invention relates to the general problem of power measurement at ultra high frequencies, and more specifically concerns a thermal, or calorimeter type wattmeter suitable for accurate and rapid metering in wave guide power transmission systems.

The basic principles involved in the measurement of power output of magnetrons and other high frequency generators have been described in detail in application, Serial No. 609,666, filed August 8, 1945, entitled "Dry Calorimeter."

Briefly, the problem is that of absorbing the generated energy in a suitable load and determining the actual power from fundamental calorimeter considerations. The wattmeter disclosed in the above named application effectively eliminated the complex liquid flow apparatus previously encountered in connection with absorption type wattmeters, through the utilization of a dry dissipative element within a transmission line stub section. For a fixed power input to an electrical load of this type, the generated heat causes a temperature rise, which in time, exponentially approaches a steady state value. A close approximation of the true power dissipation may be obtained upon the assumption of a linear relationship between power input to the load and rise in temperature provided that the overall temperature rise is large and the time for measurement is small.

Structurally, the dry calorimeter, as described in the aforementioned application, is a coaxial line stub filled in part with a dry mixture of plain quartz and aquadag coated sand. A thermal sensitive element extends into the line section and contacts the sand load. The load impedance is carefully matched to the line characteristic impedance, and accordingly the calorimeter may be used in connection with all coaxial lines of the same characteristic impedance. The application thereof is independent of frequency, insofar as the frequency does not affect load or line impedances.

Considerable difficulty has been experienced in attempting to utilize this type of coaxial dry calorimeter wattmeter in connection with the measurement of power output of high frequency generators which are directly coupled to wave guide transmission systems. The use of an adaptor for transition between wave guide and coaxial calorimeter introduces a significant error, primarily due to mismatch, and results in a marked departure from the ideal, desired standing wave ratio of unity.

My present invention contemplates a dry calorimeter wattmeter of simplified and inexpensive wave guide construction, readily adaptable to wave guide power transmission measurement over a comparatively wide frequency band. Physically this wattmeter is a wave guide stub having a power input end with coupling for suitably connecting the wattmeter to the generator of the high frequency power to be measured. A rectangular guide cross section is used, and a dry load is positioned within the stub having an inclined surface so that the impedance of the load remains substantially constant over a band of frequencies. A conveniently read dial type thermometer extends through a wall of the wave guide stub and into the load composition so that temperature change therein is readily observed.

It is therefore an object of my invention to provide a novel, mechanically simple, dry calorimeter wattmeter of wave guide construction.

Another object of my invention is to provide an ultra high frequency dry calorimeter wattmeter utilizing the rise in temperature in a semi-conductive composition as a basis for determining the power output in a wave guide power system.

A further object of my invention is to provide a wattmeter, comprising a wave guide stub utilizing a dry resistive composition for dissipation of the generated power to be measured, and a thermometer having temperature change calibrated in power units.

Figure 2:
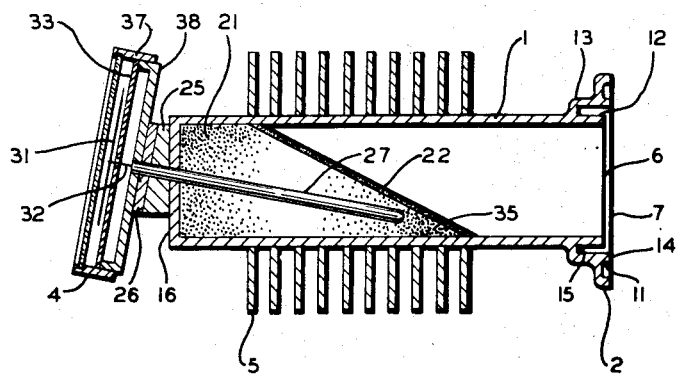

These and other objects of my present invention will now become apparent from the following specification taken in connection with the accompanying drawings in which:

Fig. 1 is a general external view of one embodiment of my wave guide dry calorimeter wattmeter; and Fig. 2 is a cross sectional view of the calorimeter wattmeter illustrated in Fig. 1.

Referring now to Fig. 1, it may be seen that the wattmeter comprises essentially a rectangular wave guide stud 1 fitted at one end thereof with a coupling plate or flange 2 for attaching the wattmeter to the source whose power output is to be measured. Mechanically the wattmeter of Fig. 1 is coupled by bolting the coupling plate 2 to a cooperating plate on the power source wave guide, through a plurality of threaded holes 3. The electrical function of the coupling plate 2 will be described hereinbelow in greater detail. The opposite end of the wave guide wattmeter 1 supports a dial type, direct reading thermometer 4. To facilitate the rapid cooling of the wattmeter, a number of metallic cooling fins 5 are secured to the outer walls of the wave guide section 1.

The physical size and number of these cooling fins and their relative position upon the wave guide section are dependent upon the power capabilities of the particular wattmeter.

For a more detailed explanation of the physical structure of this wattmeter, reference is now made to Fig. 2. The coupling plate 2, which may be an integral part of the wave guide section 1, provides an electrical coupling feature, which although well known to the art, will be briefly described here. As illustrated the open end 6 of the wave guide section 1 is undercut from the substantially plane square surface 7 of the coupling plate 2. A circular slot 11 is milled in the face of the coupling plate 2, for the insertion of a rubber gasket so that moisture-proof connection is established between the wattmeter and power source wave guide sections. Another circular slot 12 is milled into the circular boss 13 which extends from the coupling plate 2, as illustrated in both Figs. 1 and 2. The depth of this slot is approximately one-quarter wave length at the average frequency of operation. Electrical contact between wave guide sections is established along the outermost surface of circular ridge 14 between the circular slots 11 and 12. At the frequency of operation, the distance measured from the wall of the rectangular wave guide at the point of maximum electric field intensity to the innermost face 15 of the circular slot 12 is substantially one-half wave length. Thus, at the point of maximum field intensity the effective impedance between coupled wave guide sections is that of a half wave length of line with short circuited termination, which as is well understood, is an apparent short circuit. In this manner, positive, low impedance electrical contact is established between coupled wave guide sections. This coupling device forms no part of the present invention, and any of the other well known wave guide connectors may be utilized.

The opposite end of the wave guide 1 is terminated by a shorting plate 16. As viewed from the open end of the wave guide 6, the wattmeter thus appears to be a stub, the electrical length of which is, for reasons to be described later, unimportant.

The wave guide stub section is filled in part with a composition 21 of a semi-conductive material of extremely high attenuation and preferably comprising a uniform dry mixture of plain quartz sand and aquadag coated sand. The exposed surface of the sand composition 21, facing the open end 6 of the wave guide stub, is sloped as illustrated and secured by a positioner 22 cemented to the wave guide walls. The positioner 22 is preferably a thin dielectric material having a dielectric constant of the order of that of the sand mixture 21.

The thermometer 4 is secured to the short circuiting plate 16 by a pair of separators 25 and 26. Separator 25 is sloped so that the stem 27 of the thermometer 4 enters the wave guide 1 at an angle as illustrated. The thermometer 4 operates on the well known principle of the differential expansion of a bimetal strip. The bimetal is in the form of a helix (not shown) positioned within the cylindrical stem 27 and attached to the pointer 31 by rotatable shaft 32. A change in temperature in the region of the stem 27 will result in the development of a torque which will rotate the pointer over the calibration card 33. Experiment has shown that the exact position of the thermometer stem 27 within the electrical load composition 21 is unimportant insofar as accuracy of power readings is concerned; but that highest sensitivity is attained when the stem is near the inclined positioner 22. In this particular embodiment of the wattmeter, the thermometer is positioned by separators 25 and 26 so that the end of the stem 27 is supported a short distance behind the exposed surface of the load 21.

To determine the high frequency power output of a signal source connected to a wave guide transmission system, the wattmeter wave guide stub is attached thereto by the coupling plate 2. The generated electromagnetic waves contain an electric component, which for an advantageous transmission mode, is oriented normal to the wider pair of wave guide walls, or as viewed in Fig. 2, normal to the plane of the drawing and parallel to the inclined plane of the semi-conductive load composition 21. Maximum electric field intensity exists in a plane passing through the longitudinal axis of the stub and zero field intensity exists at the upper and lower surfaces of the guide. The electromagnetic wave entering the wave guide wattmeter section first contacts the load composition 21 at the leading edge 35 in the region of minimum field intensity. Thus the dissipation at section 35 of the load 21 is comparatively small. The power dissipation increases as the wave progresses into the wattmeter section and the high electric field intensity components contact the semi-conductive sand composition 21.

The gradual introduction of the load section 21 resulting from the sloping sand surface, determined by the dielectric positioner 22, effectively minimizes the discontinuity of the dielectric change to limit the extent of reflections and mismatch between load impedance and wave guide section impedance. The impedance match obtained is constant over a fairly broad frequency band. The limitations to the extent of this frequency band are the normal cut-off frequency of the wave guide stub and the frequency band over which the coupling device used will permit complete transfer of energy from source to load with a standing wave ratio near unity.

Attenuation of the electromagnetic wave traveling through the load 21 is rapid due to dissipation in the form of heat, so that the amount of energy striking the inner surface of the shorting plate 16 is comparatively small. This energy is reflected by the shorting plate 16 and again travels through the attenuating electrical load 21. The axial length of the load 21 is sufficient so that ordinarily the amount of reflected energy passing out through the positioner 22 and the open end 6 of the wattmeter section is negligible.

Since the energy entering the wave guide through the open end 6 is for all practical purposes completely dissipated therein, the wattmeter acts as a perfect absorber or resistor and it is unnecessary to design the wave guide stub so that it is a definite fraction or number of wave lengths. This feature also minimizes the independence of wattmeter operation and frequency.

The dissipation of the radio frequency energy in the semi-conductive material 21 results in a considerable rise in temperature, and if continued at a constant power input, the temperature as indicated by thermometer 4 would rise exponentially to a steady value as determined by a balance between the rate of power dissipation and the rate of cooling. For a short period of time, however, the temperature rise is substantially linear and the change relative to ambient is representative of the power dissipation within the material 21. To determine power, therefore, it is merely necessary to take the initial temperature reading and the final temperature reading after an established short interval of time. This difference in temperature is calibrated in terms of power input to the wattmeter.

To facilitate reading, the thermometer pointer 31 may be rotatably mounted upon the thermometer shaft 32 by means of a slipping clutch, or the calibration card 33 may be secured to the outer thermometer housing 37 and may be made rotatable over the thermometer backing plate 38, so that in either instance, the pointer 31 may be reset effectively to read zero before each measurement. Thus the final temperature reading will directly indicate the temperature rise and the thermometer scale may be calibrated to read power in watts.

After each measurement, it is necessary for the wattmeter load to be reduced in temperature to the ambient in order for the assumed linear relation between power input and temperature rise to be valid for a subsequent test. This cooling is accelerated by the fins 5.

It is evident that the wave guide calorimeter wattmeter illustrated in these figures is subject to various structural changes for particular applications thereof. For example, any thermal sensitive element may be substituted for the dial type thermometer 31. A conventional glass thermometer or insulated thermocouple would serve to measure power dissipation in the manner described above.

Thus in view of the various modifications of the wattmeter illustrated which will now be apparent to those skilled in the art, I prefer that the spirit and scope of this invention be limited not by the specific disclosure above but by the appended claims.

I claim:

1. A radio frequency wattmeter comprising, a section of rectangular wave guide open at one end and closed at the other end, an electrical load comprising, a composition of dry semi-conductive material positioned at the closed end of said section and maintained in position by a sheet of dielectric material secured transversely of said guide, said sheet of dielectric being inclined toward said open end and lying in a plane parallel to the electric component of waves flowing into said wave guide section, and a thermometer extending through an opening in the closed end of said wave guide section into said load for measuring the temperature thereof.

2. A radio frequency wattmeter comprising a section of rectangular wave guide open at one end and closed at the other end and attachable at its open end to a source of radio frequency power to be measured, an electrical load of dry semi-conductive material positioned within and completely filling said wave guide section for a portion of its length from its closed end, said load having a sloping surface lying in a plane parallel to the electric component of power flowing into said section and inclined toward said open end of the wave guide section, and a stem-type thermometer extending through an opening in the closed end of said wave guide section and into said load for measuring the temperature thereof, the stem portion of said thermometer within said load terminating a short distance behind the exposed sloping surface of said load and being inclined toward the forward edge of said sloping surface.

LOWELL M. HOLLINGSWORTH.

References Cited in the file of this patent

UNITED STATES PATENTS

| Number | Name | Date |
|---|---|---|
| 2,197,122 | Bowen | Apr. 16, 1940 |
| 2,197,123 | King | Apr. 16, 1940 |
| 2,273,547 | Radinger | Feb. 17, 1942 |
| 2,398,606 | Wang | Apr. 16, 1946 |
| 2,409,599 | Tiley | Oct. 15, 1946 |
| 2,427,094 | Evans | Sept. 9, 1947 |
| 2,430,130 | Linder | Nov. 4, 1947 |
| 2,438,915 | Hansen | Apr. 6, 1948 |
| 2,453,645 | Tiley | Nov. 9, 1948 |
| 2,464,277 | Webber | Mar. 15, 1949 |